(12) United States Patent
Thacker et al.

(10) Patent No.: US 7,581,760 B2
(45) Date of Patent: Sep. 1, 2009

(54) HOSE COUPLING ENDFORM FOR FLUID TRANSFER ASSEMBLIES

(75) Inventors: James Clifton Thacker, Marion County, FL (US); Herb Lemaster, Marion County, FL (US); Marshall Hite, Marion County, FL (US); Danny Strickland, Marion County, FL (US)

(73) Assignee: YH America, Inc., Versailles, KY (US)

( * ) Notice: Subject to any disclaimer, the term of this patent is extended or adjusted under 35 U.S.C. 154(b) by 458 days.

(21) Appl. No.: 11/444,465

(22) Filed: May 31, 2006

(65) Prior Publication Data

US 2007/0278789 A1 Dec. 6, 2007

(51) Int. Cl.
*F16L 33/00* (2006.01)
(52) U.S. Cl. .................. 285/239; 285/242; 285/332.1
(58) Field of Classification Search ......... 285/239–240, 285/242, 332.1; 604/533–535
See application file for complete search history.

(56) References Cited

U.S. PATENT DOCUMENTS

| | | | |
|---|---|---|---|
| 3,653,692 A | 4/1972 | Henson | |
| 3,689,111 A | 9/1972 | Osmun et al. | |
| 4,114,930 A | 9/1978 | Perkins et al. | |
| 5,423,581 A | 6/1995 | Salyers | |
| 5,516,156 A | 5/1996 | Williamson | |
| 5,516,157 A | 5/1996 | Williamson | |
| 5,707,087 A | 1/1998 | Ridenour et al. | |
| 5,711,549 A | 1/1998 | Beans | |
| 6,113,151 A | 9/2000 | Beans | |
| 6,378,908 B1 | 4/2002 | Walker et al. | |
| 6,412,826 B1 | 7/2002 | Kulevsky et al. | |
| 6,568,714 B2 | 5/2003 | Stripe | |
| 6,634,679 B1 | 10/2003 | Stieler | |
| 6,637,779 B2 | 10/2003 | Andre | |
| 6,733,047 B1 | 5/2004 | Stieler | |
| 6,880,862 B2 * | 4/2005 | Mobley et al. ............... 285/238 |

* cited by examiner

*Primary Examiner*—Aaron M Dunwoody
*Assistant Examiner*—Fannie Kee
(74) *Attorney, Agent, or Firm*—Dinsmore & Shohl LLP

(57) ABSTRACT

An endform connector having an axial bore through which a fluid is conveyed comprising: a rigid tubular member having a first terminal end, a second terminal end, a channel having an inner diameter extending from the first terminal end to the second terminal end through which a fluid is transported, a stem portion extending a fixed distance from the first terminal end, and at least one sealing member extending radially outward from the stem portion forming a radially increasing surface having a tapered profile terminating in a rim, which exhibits an ellipsoidal perimeter, adapted to be inserted into an inner channel of a fluid transport hose; wherein the endform connector is sealed to the fluid transport hose; and, a connector portion on the second terminal end adapted to be coupled with a fluid conveying structure.

10 Claims, 5 Drawing Sheets

HOSE COUPLING ENDFORM FOR FLUID TRANSFER ASSEMBLIES

BACKGROUND OF THE INVENTION

The present invention relates to a coupler device for hose connections and to a method for connecting such endform to a hose. More particularly, the present invention relates to a coupling endform device including a barb having an ellipsoidal profile which requires less coupling effort during assembly of the coupling device to a hose, compared to a conventional coupling device having a circular barb profile.

Hose coupling endform devices are known. For example, commonly assigned U.S. Pat. No. 6,880,862 to Mobley teaches a coupling device for connecting a polymeric tubing having a first conductive inner surface to the open end of a hose having a second conductive surface such that conductive continuity is maintained between the polymeric tube and the hose. U.S. Pat. No. 3,653,692 to Henson describes an elastomeric hose connected to a nipple having a circumferential barb. The hose is stretched allowing a ring member to slide down the hose and over the barbed nipple where it creates a compression on the hose when the hose is no longer stretched. U.S. Pat. No. 6,733,047 to Stieler; U.S. Pat. No. 6,637,779 to Andre; U.S. Pat. No. 6,634,679 to Stieler; U.S. Pat. No. 6,568,714 to Stripe; U.S. Pat. No. 6,412,826 to Kulevsky, et al; U.S. Pat. No. 6,378,908 to Walker, et al.; U.S. Pat. No. 6,113,151 to Beans; U.S. Pat. No. 5,711,549 to Beans; U.S. Pat. No. 5,707,087 to Ridenour et al; U.S. Pat. No. 5,516,157 to Williamson; U.S. Pat. No. 5,516,156 Williamson; U.S. Pat. No. 5,423,581 to Saylers; U.S. Pat. No. 4,114,930 to Perkins et al; and U.S. Pat. No. 3,689,111 to Osmun, all teach coupling devices for connecting tubing to a fitting assembly to prevent leaks in a fluid transport system.

It is essential that fluid transfer hoses such as those employed in fluid transfer assemblies on power steering pressure and return lines exhibit tight tolerances and high strength to prevent the fluid from leaking from the assembly. Current practice in the hose connector art requires that a heavy clamping or crimping force be applied about a collar around the hose and the fitting to provide a fluid-tight seal and to provide pull-off resistance to the assembly. In such cases, the hose is compressed radially inward to make a seal. However, it is difficult to make a leak-tight seal, because the tube, even though malleable, tends to have enough elasticity to relax and deform upon release of the clamping or crimping pressure sufficient to compromise the fluid-tight seal, particularly when the fluid is under high pressure for an extended period of time. Therefore, while conventional connectors generally are able to achieve the required tolerances or the strength required to provide good sealing and hose retention properties, these properties are generally accompanied by undesirable high assembly effort. For example, a fluid transfer assembly designed to achieve low push-on force throughout its dimensional tolerance, will have a high probability of poor to mediocre coupling tensile, burst and impulse performance.

Accordingly, it would be advantageous to provide a hose endform connector that would increase coupling retention using both clamped and crimped assembly design while requiring reduced assembly effort force

SUMMARY OF THE INVENTION

It is an object of the present invention to provide a hose coupling endform having improved coupling retention and sealing properties while requiring reduced assembly effort force.

It is another object of the invention to provide a method of assembling a hose endform connector to a hose whereby coupling retention is improved and assembly effort is reduced.

In accordance with the present invention, a hose endform connector is described for use in connecting a fluid transfer hose thereto in a manner which provides a leak-free fluid transfer assembly having increased coupling retention while reducing the assembly effort force required in prior art hose endform connection assemblies. The hose endform connector comprises a rigid tubular member having a first end and a second end. The hose endform connector has a channel extending from the first end to the second end. The channel exhibits an inner diameter extending along its longitudinal axis for transporting a fluid therethrough. The rigid tubular member further comprises a stem portion defining the first end of the rigid tubular member. The stem portion has a uniform annular outer surface diameter extending a predetermined distance from the end of the hose endform connector, wherein the uniform annular surface is adapted to be inserted into an open ended channel of a hose. The stem portion further includes at least one sealing member extending outward from the outer surface diameter of the stem portion in a direction toward the second end to form a radially increasing surface having a tapered profile. The tapered surface terminates in an outward rim having an ellipsoidal shape. The opposite side of the tapered surface of the sealing means exhibits an annular surface which is perpendicular or near perpendicular to the rigid tubular member. The ellipsoidal shape of the outer perimeter of the sealing member reduces assembly effort by as much as 50% leaving coupling tensile (axial force) unaffected.

The second end portion includes a tubular structure which may include an annular ridge or ring suitable for connecting the second end to another tubular structure, such as by a quick-connect/disconnect device.

In accordance with the present invention, the metal fitting is loosely inserted into the open end of the hose where it is joined to the tube in a fluid-tight seal created by crimping, swaging, rolling or other means of securing the hose around the metal barbed fitting. The fluid-tight seal is created by the high pressure of the metal annular barbs pressed against the inner diameter of the hose.

DETAILED DESCRIPTION OF THE INVENTION

It has been found that a hose endform connector having an arrowhead barb configured to exhibit an ellipsoidal perimeter rather than a circular circumference overcomes current assembly problems by providing significantly reduced push-on force in assembling the endform connector to a hose, and achieving superior coupling tensile force compared to prior art endform connectors which employ an arrowhead barb having a circular circumference.

The basic concept of the present invention is to change the shape of the outer perimeter of the arrowhead barb from a circular shape to an ellipsoidal shape. Changing the shape of the arrowhead barb significantly reduces assembly effort by about 50% while maintaining coupling tensile (axial force) unaffected over a wider tolerance. Assembly effort is primarily a function of interference between the hose inner diameter, the arrowhead barb outer diameter, and the stem land. Changing the outer perimeter of the arrowhead barb to an ellipsoidal or oval shape allows the barb circumference to be reduced while retaining an equivalent peak diameter, in comparison to symmetrically circular shapes.

The advantage of the ellipsoidal design can best be explained by the following comparison:

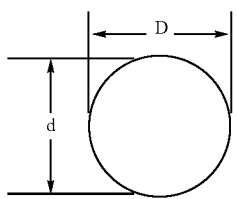

The circumference of a circle is: $C = \pi D$

The perimeter of an ellipsoid or oval shape is approximated by $$C \approx \pi \frac{(D+d)}{2}$$

The "d" dimension can be significantly reduced. This will significantly reduce assembly effort. The "D" value will remain unchanged in order to maintain equal coupling tensile force relative to the circular rim configuration. The potential applications for the endform connectors having the present ellipsoidal configuration include assemblies for automotive and other mechanical applications, such as in power steering, transmission, oil cooler, and other fluid transport assemblies requiring high pressures.

In determining the perimeter of the ellipsoidal rim the ratio of the "D" dimension to the "d" dimension is greater than 1 but should not be greater than about 1.5. Preferably, the ratio of "D" to "d" is about 1.01 to 1.25. Most preferably, about 1.05 to 1.20 depending on the properties desired.

Figure 1:
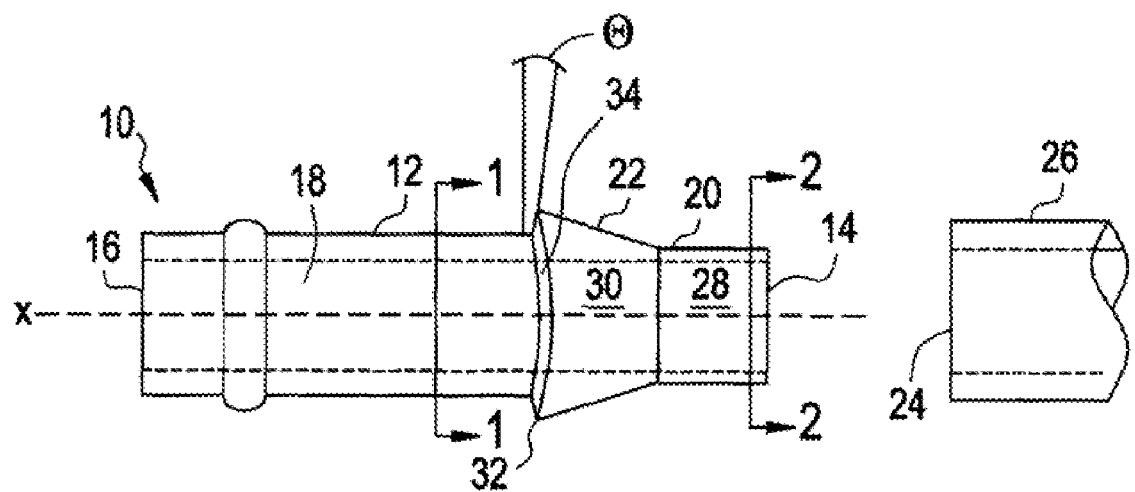
FIG. 1 is a longitudinal side view of an endform tube connector of the present invention ready for assembly with a hose.
Figure 2A:
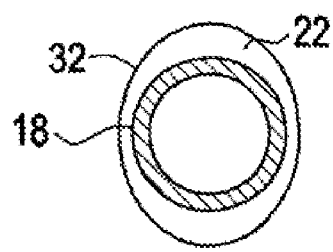
FIG. 2A is a cross-sectional end view of the endform tube connector taken along line 1-1 of FIG. 1.
Figure 2B:
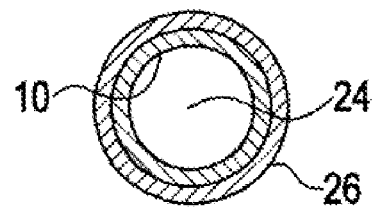
FIG. 2B is a cross-sectional end view of an endform tube connector taken along line 2-2 of FIG. 1.

FIGS. 1, 2A and 2B illustrate a hose endform connector of the present invention used to connect an end form connector to a polymeric hose. As shown in FIG. 1, the endform connector 10 includes a tubular body 12 having a first end 14 and a second end 16. A channel 18 extends along longitudinal axis X from the first end 14 to the second end 16. The tubular body 12 includes a stem portion 20 and a sealing member 22 adjacent the first end 14 of the tubular body 12. The stem portion 20 and the sealing member 22 are adapted to be inserted into an open channel 24 of a hose 26 to secure the hose 26 to the endform connector 10 to provide a leak-free connection. The stem portion 20 has a uniform outer annular surface 28 extending a fixed distance from the first end 14 of the tubular body 12. The sealing member 22 extends radially outward from the outer annular surface 28 of the stem portion 20 to form a radially increasing surface 30 having a tapered profile. The radially increasing surface 30 of the sealing member 22 terminates in a rim 32 exhibiting an ellipsoidal perimeter. The sealing member 22 includes a rearward surface 34 lying in a plane perpendicular to or nearly perpendicular to the orientation of the tubular body 12. The rearward surface 34 of the sealing member 22 extends radially outward from the tubular body 12 and terminates with the rim 32 exhibiting an ellipsoidal perimeter. Typically, the rearward surface 34 may be tapered at an angle θ of up to about 5°, preferably, about 0 to 3° and most preferably, about 0 to 2°, with respect to the vertical orientation of the rearward surface 34. The stem portion 20 is adapted to be inserted into an open end 24 of a hose 26 to provide a leak-free fitting. FIG. 2A shows a cross-sectional view of the endform connector along line 1-1 of FIG. 1, wherein the rim 32 of the sealing member 22 is shown as having an ellipsoidal configuration while the channel 18 of the tubular body has a circular configuration. FIG. 2B shows a cross-sectional view of the stem portion 20 of the endform connector 10 connected to a hose 26 long line 2-2 of FIG. 1.

When the endform connector 10 is inserted into the open end of the hose 26, sufficient pressure is exerted upon the hose 26 to radially compress the hose 26 inward around the stem portion 20 of the end fitting 10 such that the open channel 24 of the hose 26 engages the sealing member 22 providing a leak-free seal in the fluid transport assembly. The sealing members 22 not only provide leak-free seals but they also increase the pull-off resistance of the hose 26 from the endform connector 10.

The number of sealing members on the endform connector is not critical. One sealing member in the form of an arrowhead barb is sufficient in most applications; however, it may be desirable to include more than one sealing member at fixed intervals along the stem portion of the endform connector. In those instances where more than one sealing member is employed, It may be desirable to alter the rotational position of the more than one sealing members to exhibit a non-linear orientation of the ellipsoidal rims so that the "D" diameters of all arrowhead barbs are not in a linear relationship.

The materials used to form the endform connector should be of a low corrosion tolerance material, such as steel or the like. Such materials should be high quality and free from voids, pits, laps, cracks, folds, seams and other defects. It is within the context of the present invention to treat the metal or ceramic endform connectors, especially the arrowhead barbs, to protect them from the environment. The endform members may be coated with a polymeric material 36 (FIG. 1) such as nylon, or the metal may be electroplated, painted or similarly treated.

Example 1

Figure 3A:
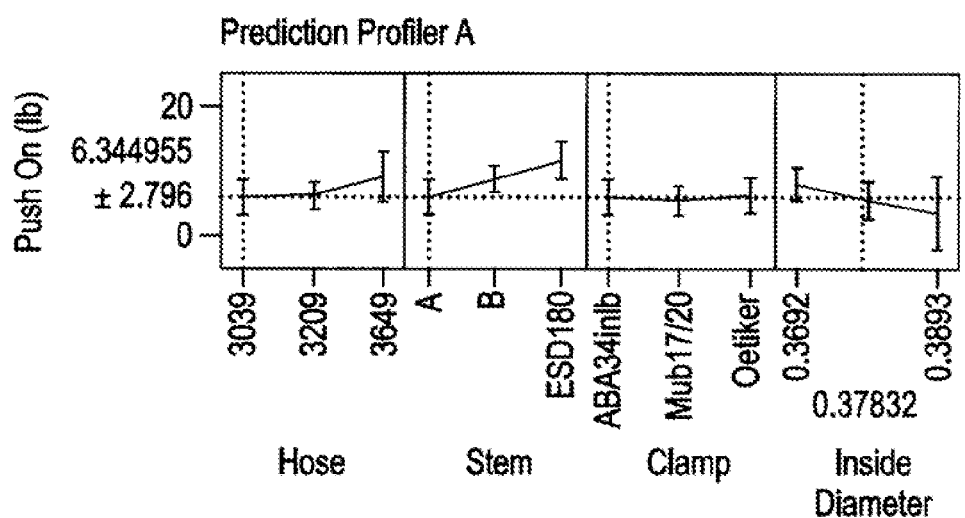
FIG. 3A is a graph illustrating the push-on force necessary to assemble an endform connector of the present invention with a hose of Example 1, Sample 1.
Figure 3B:
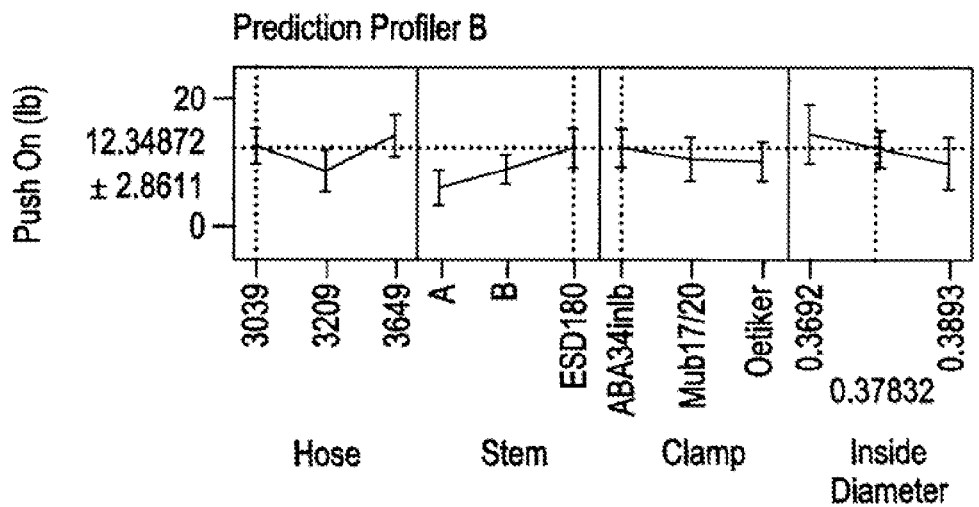
FIG. 3B is a graph illustrating the push-on force necessary to assemble an endform connector of the prior art with a hose of Example 1, Sample 2.

FIGS. 3a & 3b

SAMPLE 1—A first endform connector having an ellipsoidal shaped arrowhead barb in accordance with the present invention, and a fluid transport hose were assembled to determine the push-on force necessary to form the assembly.

COMPARATIVE SAMPLE 2—A second endform connector having a circular shaped arrowhead barb in accordance with the prior art, and a fluid transport hose were assembled to determine the push-on force necessary to form the assembly.

All factors were constant in samples 1 and 2 except for the stem (Sample 1 having an ellipsoidal shaped barb and Sample 2 having a circular rim). The push-on force for Sample 1 having the ellipsoidal rim was 49% lower than Sample 2 having the circular rim.

Example 2

Figure 4A:
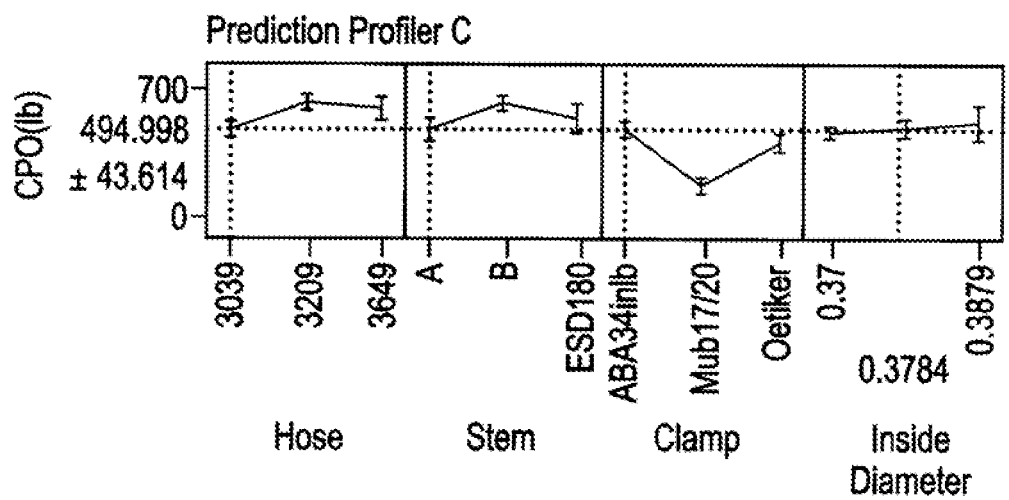
FIG. 4A is a graph illustrating the coupling tensile force of an endform connector of the present invention assembled with a hose using a screw clamp of Example 2. Sample 3.
Figure 4B:
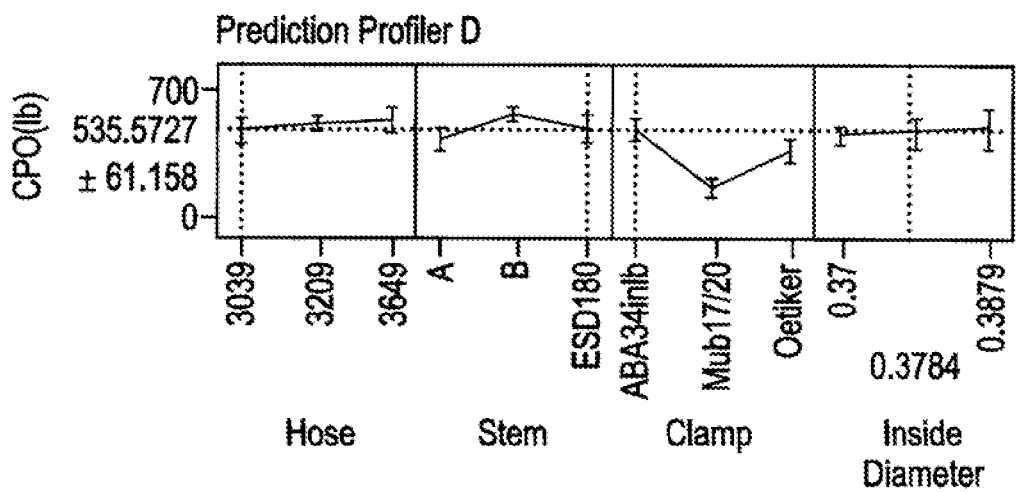
FIG. 4B is a graph illustrating the coupling tensile force of an endform connector of the prior art assembled with a hose using a screw clamp of Example 2, Sample 4.

FIGS. 4a & 4b

SAMPLE 3—Same as SAMPLE 1 except that the endform having an ellipsoidal shaped barb and the fluid transport hose were assembled and clamped using an ABA screw clamp to determine coupling tensile force exhibited by the ABA screw clamp on the assembly according to the present invention.

COMPARATIVE SAMPLE 4—Same as COMPARATIVE SAMPLE 2 except that the endform connector having a circular shaped arrowhead barb were assembled and clamped using an ABA screw clamp to determine the coupling tensile force exhibited by the ABA screw clamp on the prior art assembly.

All factors were constant except for the stem (Sample 3 having an ellipsoidal shaped barb and Sample 4 having a circular barb). The coupling tensile force of SAMPLE 3 was statistically equivalent to that of SAMPLE 4. The mean value differences show SAMPLE 3 to have a 40.6 lb higher tensile force relative to SAMPLE 4.

Example 3

Figure 5A:
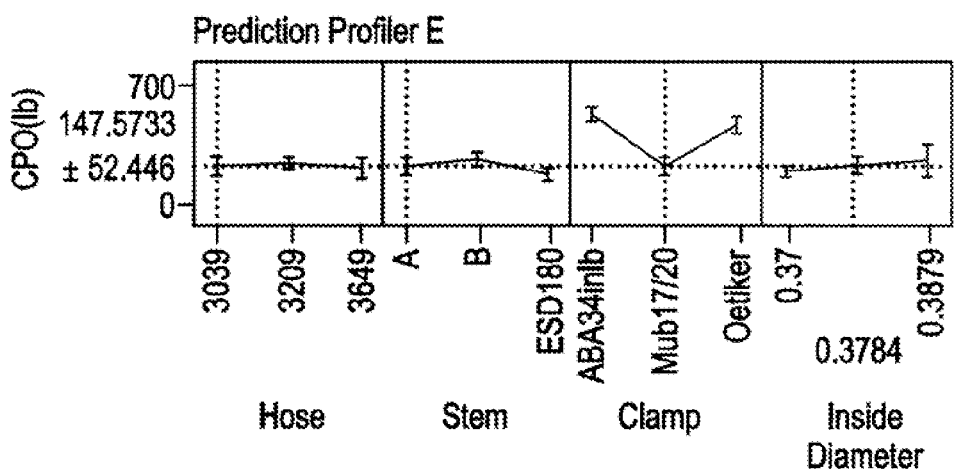
FIG. 5A is a graph illustrating the coupling tensile force of an endform connector of the present invention assembled with a Mubea constant tension clamp of Example 3, Sample 5.
Figure 5B:
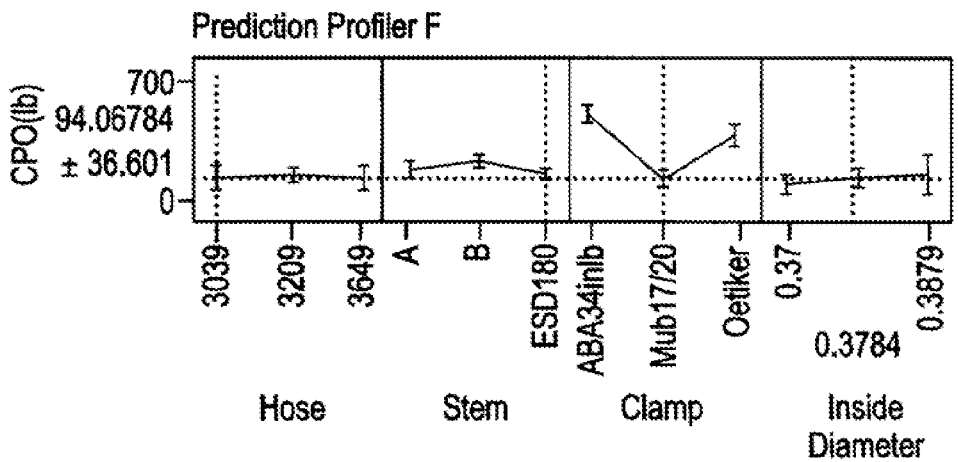
FIG. 5B is a graph illustrating the coupling tensile force of an endform connector of the prior art assembled with a Mubea constant tension clamp of Example 3, Sample 6.
Figure 6A:
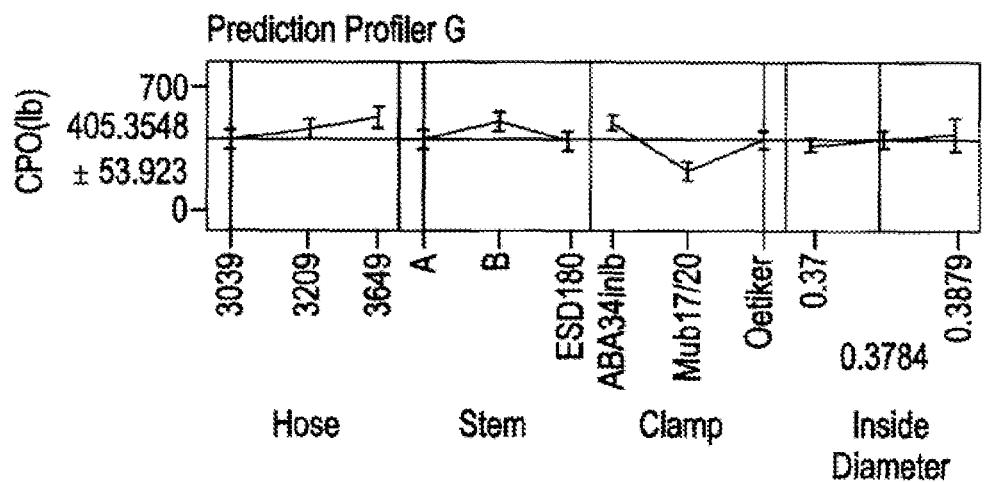
FIG. 6A is a graph illustrating the coupling tensile force of an endform connector of the present invention assembled with a hose using an Oetiker clamp of Example 4, Sample 7.
Figure 6B:
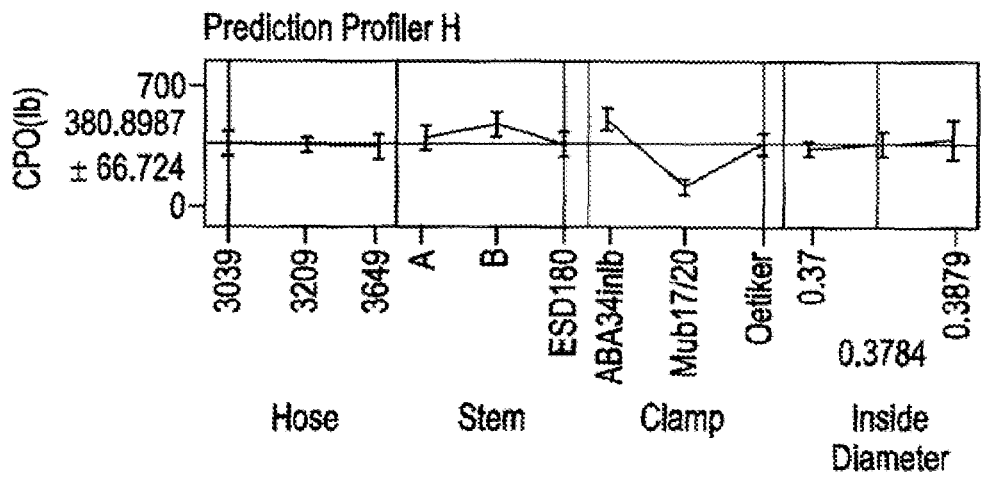
FIG. 6B is a graph illustrating the coupling tensile force of an endform connector of the prior art assembled with a hose using an Oetiker clamp of Example 4, Sample 8.

FIGS. 5a & 5b

SAMPLE 5—Same as SAMPLE 1 except that the endform having an ellipsoidal shaped barb and the fluid transport hose were assembled and clamped using a Mubea Constant Tensile clamp to determine coupling tensile force exhibited by the Mubea Constant Tensile clamp on the assembly according to the present invention.

COMPARATIVE SAMPLE 6—Same as COMPARATIVE SAMPLE 2 except that the endform connector having a circular shaped arrowhead barb were assembled and clamped using a Mubea Constant Tensile clamp to determine the coupling tensile force exhibited by the Mubes Constant Tensile clamp on the prior art assembly.

All factors were constant except for the stem (SAMPLE 5 having an ellipsoidal shaped barb and SAMPLE 6 having a circular barb). The coupling tensile force of SAMPLE 5 was statically equivalent to that of SAMPLE 6. The mean value differences show SAMPLE 5 to have a 53 lb higher tensile force relative to SAMPLE 6.

Example 4

FIG. 6a & 6b

SAMPLE 7—Same as SAMPLE 1 except that the endform having an ellipsoidal shaped barb and the fluid transport hose were assembled and clamped using an Oetiker Tensile clamp to determine coupling tensile force exhibited by the Oetiker Tensile clamp on the assembly according to the present invention.

COMPARATIVE SAMPLE 8—Same as COMPARATIVE SAMPLE 2 except that the endform connector having a circular shaped arrowhead barb were assembled and clamped using an Oetiker Tensile clamp to determine the coupling tensile force exhibited by the Oetiker Tensile clamp on the prior art assembly.

All factors were constant except for the stem (SAMPLE 7 having an ellipsoidal shaped barb and SAMPLE 8 having a circular barb). The coupling tensile force of SAMPLE 7 was statically equivalent to that of SAMPLE 8. The mean value differences show SAMPLE 7 to have a 26 lb higher tensile force relative to SAMPLE 8.

Although the present invention has been fully described in connection with a preferred embodiment thereof and with reference to the accompanying drawings, various changes and modifications will occur to those skilled in the art. Accordingly, such changes and modifications are to be understood as being within the scope of the present invention as defined by the appended claims.

What is claimed is:

1. An endform connector comprising:
a rigid tubular member having a first terminal end configured to be inserted into an inner channel of one end of a fluid transport hose, a second terminal end configured to be coupled with a fluid conveying structure, and a channel having an inner diameter extending from said first terminal end of said tubular member to said second terminal end of said tubular member providing a path through which a fluid is transported, a stem portion extending a fixed distance from said first terminal end, and at least one sealing member extending radially outward from said stem portion forming a radially increasing surface having a tapered profile, said radially increasing surface having said tapered profile terminating in a rim exhibiting an ellipsoidal perimeter, said at least one sealing member also including a rearward surface lying in a plane perpendicular to or nearly perpendicular to the orientation of the tubular member, said rearward surface extending radially outward from the tubular member and terminating with said rim exhibiting said ellipsoidal perimeter, said stem portion adapted to be sealably inserted into the inner channel of the fluid transport hose to provide a leak-free fitting.

2. The endform connector of claim 1, wherein said sealing member is an arrowhead barb.

3. The endform connector of claim 2, wherein said rim having said ellipsoidal perimeter exhibits a sharp edge.

4. The endform connector of claim 1, wherein said ellipsoidal perimeter is configured to provide a leak-free seal between said endform connector and the fluid transport hose into which said endform connector is inserted.

5. The endform connector of claim 1, wherein said endform connector is made from a material selected from the group consisting of metal, ceramic or plastic.

6. The endform connector of claim 5, wherein said endform connector is made from metal.

7. The endform connector of claim 6, wherein said metal is steel.

8. The endform connector of claim 1, wherein said endform connector is pre-coated with a protecting material to protect said endform connector from environmental conditions.

9. The endform connector of claim 8, wherein said protective material is nylon.

10. The endform connector of claim 1, wherein said second terminal end of said tubular member is configured to be coupled to a fluid conveying structure employing a quick connect/quick disconnect coupling.

* * * * *

UNITED STATES PATENT AND TRADEMARK OFFICE
CERTIFICATE OF CORRECTION

PATENT NO.       : 7,581,760 B2                                                       Page 1 of 1
APPLICATION NO.  : 11/444465
DATED            : September 1, 2009
INVENTOR(S)      : Thacker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this

Fourteenth Day of September, 2010

David J. Kappos
*Director of the United States Patent and Trademark Office*